July 23, 1963 DE WITT H. MILLER 3,098,965
CLOSED LOOP CONTROL DEVICE
Filed May 16, 1961
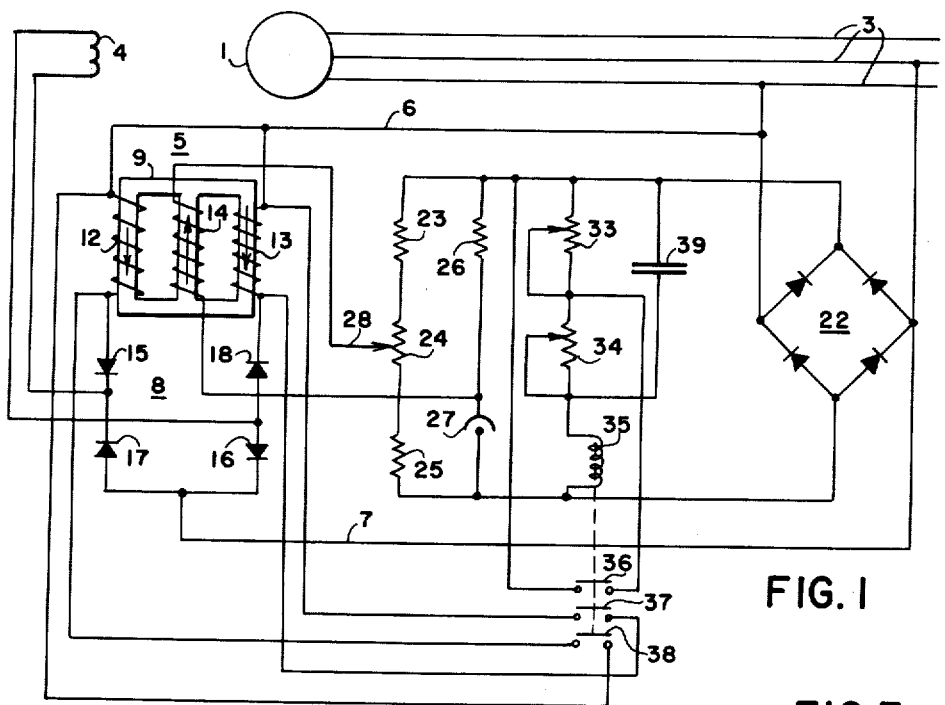
FIG. 1
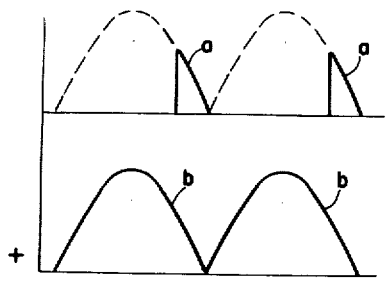
FIG. 2
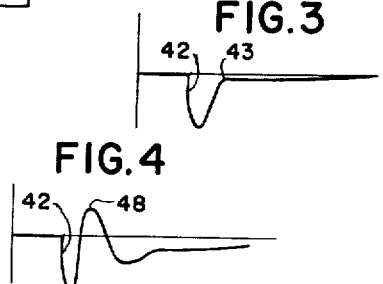
FIG. 3
FIG. 4
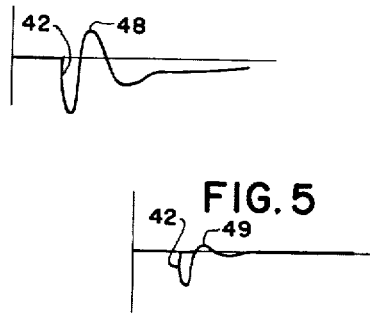
FIG. 5
INVENTOR.
DeWITT H. MILLER
BY Merton D. Mone
ATTORNEY

United States Patent Office 3,098,965
Patented July 23, 1963

3,098,965
CLOSED LOOP CONTROL DEVICE
De Witt H. Miller, Waynesboro, Va., assignor to General Electric Company, a corporation of New York
Filed May 16, 1961, Ser. No. 110,394
6 Claims. (Cl. 322—28)

My invention relates to closed loop control devices such as servo loops, or regulating systems where it is desired to increase by a large ratio the transient gain of the loop to produce fast response.

More particularly, my invention relates to generator voltage regulators and it has for its object to reduce dips in generator voltage produced by sudden increases in load on said generator.

Commonly the voltage of electrical generators, particularly alternating current generators, is regulated by use of self-saturating magnetic amplifiers. Such amplifiers are described in an article by H. E. Larson and T. Dunnegan, Jr., published in the "Iron and Steel Engineer" for July 7, 1950, vol. 27, No. VII, pages 88 to 102, and a voltage regulator employing such a magnetic amplifier is described in Morgan Patent 2,675,518, issued April 13, 1954.

The alternating electromotive force, produced by the generator to be regulated, is supplied through the gate winding, or windings, of the self-saturating magnetic amplifier and a rectifier to the unidirectional excitation field winding of the generator, or to its exciter. The magnetic amplifier is also provided with a control winding supplied with unidirectional electromotive force varying with the voltage to be regulated.

The gate windings, in the absence of saturation, are of high impedance. The rectifiers in circuit therewith produce unidirectional current in these windings which produce unidirectional flux in the core on which the windings are wound, this unidirectional flux normally being sufficient to produce saturation. This flux is opposed, however, by flux produced by unidirectional current in the control winding. This current may be adjusted for desired operation. For example, it may be adjusted to produce saturation at a time late in each half cycle of alternating current in the gate windings whereupon short pulses of unidirectional current flow in the gate windings, rectifier, and exciting field coil, at the end of each half cycle thereby producing light excitation of the generator. Decrease in control current causes saturation to occur earlier in the half cycle, thereby producing longer pulses and greater effective current in the field winding. Thus by regulating this current in the control winding in accord with the variations in the generator voltage very satisfactory voltage regulation may be effected.

An object of my invention is to provide means for use in connection with such a voltage regulator to produce greater action with greater rapidity in response to sudden drops in voltage of the generator. A further object is to prevent "over shoot" after this rapid regulating action.

In accord with my invention means are provided quickly to short circuit the gate winding, or windings, of the magnetic amplifier in response to abrupt drops in generator voltage thereby abruptly to increase by a magnitude of 10 or 20 to 1, for example, the generator excitation voltage. At the same time means are provided to prevent excessive rise, or over shoot, of the generator voltage in response to short circuit of the amplifier gate winding, or windings.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawings in which FIG. 1 illustrates an embodiment of my invention; FIG. 2 illustrates certain characteristics pertaining to the operation of the magnetic amplifier; FIG. 3 shows the type of regulation which is effected by a self-saturating magnetic amplifier used as a regulator but which does not employ my invention; FIG. 4 shows the type or regulation obtained by use of my invention without means for preventing excessive rise in voltage, or over shooting; FIG. 5 shows the results produced by my invention in the form illustrated in FIG. 1.

Referring to FIG. 1 in the drawing, I have shown an alternating current generator at 1 arranged to supply polyphase alternating voltage to a load circuit comprising the line conductors 3. This generator has a field winding, which may be that indicated at 4, although the winding 4 may be a field winding of an exciter, which supplies unidirectional excitation voltage to the excitation field winding of the generator 1.

At 5 is shown a self-saturating magnetic amplifier which is supplied with alternating electromotive force from one phase of the output of generator 1 through conductors 6 and 7 and which, through full wave rectifier 8, supplies unidirectional excitation voltage to winding 4.

The magnetic amplifier may comprise a three-legged core 9 having gate windings 12 and 13 wound upon two legs of the core and a control winding 14 wound upon a third leg of the core. These windings are connected in circuit with the full wave rectifier 8 in such a way that unidirectional current is supplied to the exciter 4. That is, when conductor 6 is positive, current may flow through winding 12, rectifier 15, winding 4 and rectifier 16 to the conductor 7. During the opposite half cycle, current flows from conductor 7 through rectifier 17, winding 4, rectifier 18, winding 13 to conductor 6.

These rectifiers 15, 16, 17 and 18 produce unidirectional current in windings 12 and 13, which produce adding flux in the center core leg. The winding 14 on the center core leg, is supplied with unidirectional current varying with the generator voltage to be regulated and produces flux in the core opposing that produced by the current in the gate windings. This control current is derived from a full wave rectifier 22 having diagonally opposite points connected between the conductors 6 and 7 and the opposite diagonal points connected across a bridge circuit having two parallel branches, one comprising resistances 23, 24 and 25 and the other comprising a resistance 26 and a voltage regulator tube 27.

The control winding is connected between the anode of the regulating tube 27 and a variable point on the resistance 24. The regulating tube 27 has the characteristic that the voltage between its electrodes is constant notwithstanding variations in current through the tube. Therefore, the voltage of this tube is used as a reference voltage. The voltage across the bridge varies, of course, proportionately to the output voltage of the generator. The tap 28 may be adjusted so that a desired portion of that voltage is supplied to the control winding 14 of the magnetic amplifier, this portion being chosen to effect the desired level of regulation.

In FIG. 2 the curves "a" show pulses of voltage delivered by the windings 12 and 13 during the latter portion of each half cycle of the applied alternating electromotive force. During the early portion of the half cycle the core is not saturated and the windings are of high impedance so that very little current flows. During the latter portion, by reason of current in the control winding opposing the unidirectional current produced by the rectifier 8, saturation occurs resulting in greatly reduced impedance of the gate windings and in pulses of unidirectional current through each of these windings. The lesser the current in the control winding the earlier in the half cycle saturation occurs and the greater the excitation supplied to the generator.

Thus by proper adjustment of the contact 28 on the resistance 24 any desired level of regulation by the amplifier may be effected.

The above described one example of closed loop control system in which my invention finds application, but my invention of course, is not limited thereto.

In accord with my invention means are provided to produce improved action of the regulator in response to abrupt drops in voltage produced by the generator. Such abrupt drops in voltage may be produced by suddenly applied loads on the line 3.

This means comprises a circuit comprising resistances 33 and 34 and a relay winding 35 connected in series, the series combination being in shunt with the above-described bridge circuit. Relay 35 is normally energized and attracts armatures 36, 37 and 38 out of contact with their associated stationary contacts. When it is deenergized these armatures engage their respective contacts and armatures 37 and 38 short circuit the gate windings 13 and 14, while armature 36 short circuits the resistance 33.

To hasten the action of relay 35, in response to an abrupt drop in voltage produced by the generator, condenser 39 is provided in shunt with resistances 33 and 34.

Let us assume that the voltage produced by the generator is normal and that regulation is taking place by the magnetic amplifier as in its normal operation. Variations in generator voltage which occur produce variations in current in the control winding 14, which, in turn, lengthen or shorten the pulses produced in windings 12 and 13, thereby varying the excitation of the winding 4 to counteract the variations in voltage on the line 3.

However, let us suppose that, by closure of a switch, for example, a sudden abrupt load is applied to the generator. This produces an abrupt drop in voltage across the line. However, condenser 39, which is charged with a unidirectional voltage from rectifier 22, cannot immediately discharge. The value of potential at its lower electrode drops to that at an intermediate point on relay winding 35. The resistance of relay winding 35 is much lower than that of resistances 33 and 34. The discharges of the condenser, therefore, takes place through resistance 35 producing an abrupt deenergization of that winding, and causing the relay armatures 36, 37 and 38 to drop out and engage their respective stationary contacts. Armatures 37 and 38 short circuited the gate windings 13 and 14 thereby causing the entire half cycle of voltage impressed on these windings to be impressed upon the winding 4, these pulses being shown at $b$ in FIG. 2. Thus the voltage applied to winding 4 may be increased many times, perhaps twenty times, its original value causing an immediate and rapid rise in voltage at the output terminals of the generator.

To prevent excessive rise in voltage at the generator, or over shooting, the armature 36 is provided, which short circuits the resistance 33 thereby increasing the voltage supplied to relay winding 35 and causing reenergization of the relay 35 which again opens all its contacts.

FIG. 3 shows the action which may take place with the regulator of the type described but which does not employ my invention. The abrupt drop in voltage occurring at the point 42 continues and the voltage is not restored to substantially normal until the point 43.

FIG. 4 shows the operation employing my invention but without the capacitor 39 or the armature 36, which short circuits the resistance 33. It will be seen that in response to the abrupt drop at 42 a rise again occurs to a peak at 48, the peak occurring in approximately one half of the time required for restoration of normal in FIG. 3 and is followed by a subsequent minor dip before normal, or practically normal, conditions are restored.

FIG. 5 shows the results produced by my invention as illustrated. It will be seen here that the drop in voltage which occurred at 42 is even still more promptly restored at 49 without subsequent peaks, either positive or negative.

While I have shown a particular embodiment of my invention, it will, of course, be understood that I do not wish to be limited thereto since various modifications, both in the circuit arrangement and the instrumentalities employed may be made and that I contemplate by the appended claims to cover any such modifications as fall within the true spirit and scope of my invention.

What is claimed as new and desired to be secured by Letters Patent of the United Sates is:

1. In a closed loop control device having an output variable subject to undesized abrupt dips from a predetermined magnitude, the combination of means to produce a voltage varying with variations in said variable, amplifier means controlled by said voltage to counteract said variation, and means to hasten said counteraction, said means comprising a relay, a resistance, means to supply said voltage to said relay through said resistance, a condenser in shunt with said resistance whereby said condenser is normally charged, and upon abrupt drop in said voltage forces rapid deenergization of said relay, and means responsive to deenergization of said relay to produce large increase in amplification of said amplifier thereby to hasten said counteraction.

2. In a closed loop control device having an output variable subject to undesired abrupt dips from a predetermined magnitude, the combination of means to produce a voltage varying with variations in said variable, amplifier means controlled by said voltage to counteract said variation, and means to hasten said counteraction, said means comprising a relay, a resistance, means to supply said voltage to said relay through said resistance, a condenser in shunt with said resistance whereby said condenser is normally charged, and upon abrupt drop in said voltage forces rapid deenergization of said relay, and means to short circuit a portion of said resistance upon deenergization of said relay.

3. In a generator voltage regulator, means responsive to variations in the output voltage of said generator to vary the field excitation on said generator to maintain said output voltage constant notwithstanding variations in load on said generator, said means comprising a magnetic amplifier having a gate winding arranged for energization from said output and a control winding arranged for energization with unidirectional electromotive force varying with variations in said output voltage, and means to quicken the regulating response to sudden drops in said unidirectional electromotive force comprising a relay having a winding arranged for energization by said electromotive force through a resistance, a condenser in shunt with said resistance whereby upon such sudden drop in said electromotive force said condenser discharges through said winding causing its deenergization, and means to short circuit said gate winding upon deenergization of said relay winding thereby abruptly to increase the excitation of said generator.

4. In a generator voltage regulator, means responsive to variations in the output voltage of said generator to vary the field excitation on said generator to maintain said output voltage constant notwithstanding variations in load on said generator, said means comprising a magnetic amplifier having a gate winding arranged for energization from said output and a control winding arranged for energization with unidirectional electromotive force varying with variations in said output voltage, and means to quicken the regulating response to sudden drops in said unidirectional electromotive force comprising a relay having a winding arranged for energization by said electromotive force through a resistance, a condenser in shunt with said resistance whereby upon such sudden drop in said electromotive force said condenser discharges through said winding causing its deenergization, and means to short circuit said gate winding and a portion of said resistance, thereby first abruptly to increase the excitation of said generation and to reenergize said relay thereby to prevent excessive increase in said output voltage.

5. In an alternating current generator voltage regulator, a saturable reactor, having a gate winding and a control winding, means to supply voltage from the output of said generator through said gate winding and a unidirectional conducting device to the excitation field of said generator, a bridge circuit, a rectifier, means to supply voltage from said output through said rectifier to diagonally opposite corners of said bridge circuit, said bridge comprising two paths between said corners, one including a voltage regulator tube adjacent one of said corners, said control winding being connected between the terminal of said tube remote from said adjacent corner, and a desired point on the opposite path, whereby said control winding is supplied with current varying with said output voltage, a relay connected in shunt with said paths through a resistance shunted by a condenser, whereby said condenser is normally charged from said rectifier and upon abrupt drop in said output voltage discharges through said relay to cause its deenergization, and means responsive to deenergization of said relay to short circuit said gate winding.

6. In an alternating current generator voltage regulator, a saturable reactor, having a gate winding and a control winding, means to supply voltage from the output of said generator through said gate winding and a unidirectional conducting device to the excitation field of said generator, a bridge circut, a rectifier means to supply voltage from said output through said rectifier to diagonally opposite corners of said bridge circuit, said bridge comprising two paths between said corners, one including a voltage regulator tube adjacent one of said corners, said control winding being connected between the terminal of said tube remote from said adjacent corner, and a desired point on the opposite path, whereby said control winding is supplied with current varying with said output voltage, a relay connected in shunt with said paths through a resistance shunted by a condenser, whereby said condenser is normally charged from said rectifier and upon abrupt drop in said output voltage discharges through said relay to cause its deenergization, and means responsive to deenergization of said relay to short circuit said gate winding and said resistance.

References Cited in the file of this patent
UNITED STATES PATENTS

| | | |
|---|---|---|
| 2,161,179 | Logan | June 6, 1939 |
| 2,279,849 | Warrington | Apr. 14, 1942 |
| 2,611,808 | Lawrence et al. | Sept. 23, 1952 |
| 2,680,832 | Schultz | June 8, 1954 |
| 2,774,015 | White | Dec. 11, 1956 |
| 2,806,990 | Evans | Sept. 17, 1957 |

UNITED STATES PATENT OFFICE
CERTIFICATE OF CORRECTION

Patent No. 3,098,965                          July 23, 1963

De Witt H. Miller

It is hereby certified that error appears in the above numbered patent requiring correction and that the said Letters Patent should read as corrected below.

Column 4, line 13, for "undesized" read -- undesired --.

Signed and sealed this 14th day of January 1964.

(SEAL)
Attest:

ERNEST W. SWIDER
Attesting Officer

EDWIN L. REYNOLDS

Acting Commissioner of Patents